US008551657B2

(12) United States Patent
Yoshida et al.

(10) Patent No.: US 8,551,657 B2
(45) Date of Patent: Oct. 8, 2013

(54) NEGATIVE ELECTRODE FOR LITHIUM SECONDARY BATTERY, METHOD FOR PREPARING THE NEGATIVE ELECTRODE, LITHIUM SECONDARY BATTERY HAVING THE NEGATIVE ELECTRODE, AND VEHICLE HAVING THE LITHIUM SECONDARY BATTERY

(75) Inventors: Satoshi Yoshida, Susono (JP); Yuichiro Hama, Nagoya (JP); Masaru Hori, Nissin (JP); Mineo Hiramatsu, Aichi-ken (JP); Hiroyuki Kano, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/508,553

(22) PCT Filed: Nov. 10, 2010

(86) PCT No.: PCT/IB2010/002862
§ 371 (c)(1),
(2), (4) Date: May 8, 2012

(87) PCT Pub. No.: WO2011/058416
PCT Pub. Date: May 19, 2011

(65) Prior Publication Data
US 2012/0225353 A1    Sep. 6, 2012

(30) Foreign Application Priority Data
Nov. 11, 2009   (JP) .................. 2009-258396

(51) Int. Cl.
*H01M 4/58*   (2010.01)
*C01B 31/00*   (2006.01)

(52) U.S. Cl.
USPC ............... 429/231.8; 429/209; 429/218.1; 423/414; 423/445 R; 977/700; 977/755

(58) Field of Classification Search
None
See application file for complete search history.

(56) References Cited

U.S. PATENT DOCUMENTS

2009/0258164 A1   10/2009   Nakai et al.

FOREIGN PATENT DOCUMENTS

| JP | 2006-179431 | 7/2006 |
|---|---|---|
| JP | 2006-273613 | 10/2006 |
| JP | 2008-24570 | 2/2008 |
| JP | 2008-56546 | 3/2008 |
| JP | 2008-63196 | 3/2008 |
| JP | 2008-239369 | 10/2008 |
| JP | 2011-514631 | 5/2011 |
| WO | WO 00/42669 | 7/2000 |
| WO | WO 2009/108731 | 9/2009 |

OTHER PUBLICATIONS

International Search Report in International Application No. PCT/IB2010/002862; Mailing Date: Feb. 18, 2011.
Written Opinion of the International Searching Authority in International Application No. PCT/IB2010/002862; Mailing Date: Feb. 18, 2011.

(Continued)

*Primary Examiner* — Cynthia Walls
(74) *Attorney, Agent, or Firm* — Finnegan, Henderson, Farabow, Garrett & Dunner, LLP

(57) ABSTRACT

A negative electrode (10) for a lithium secondary battery, including a negative electrode collector (20), and a negative electrode active substance layer (30) that is supported on the negative electrode collector (20) and includes carbon nanowalls (32) which are formed on the negative electrode collector (20), and a negative electrode active substance (36) which is supported on the carbon nanowalls (32).

21 Claims, 11 Drawing Sheets

(56) References Cited

OTHER PUBLICATIONS

Notification of Reasons for Refusal in Japanese Patent Application No. 2009-258396; Drafting Date: Oct. 20, 2011.
N. Kitada, "Application of Carbon Nanowall to Negative Electrode Material for Lithium Ion Secondary Battery," Abstracts of Exchange Meeting of Monodukuri Gijutsu 2008, [online], Nov. 13, 2008, Kanagawa Industrial Technology Center, Internet <URL:http://www.kanagawairi.go.jp/kitri/kouhou/program/H20/poster.html> [searched Jul. 16, 2009].
O. Tanaike et al., "Lithium Insertion Behavior of Carbon Nanowalls by DC Plasma CVD and its Heat-Treatment Effect, " Solid State Ionics, vol. 180, pp. 381-385 (2009).
J. Guo et al., "Carbon Scaffold Structured Silicon Anodes for Lithium-ion Batteries," J. Mater. Chem., vol. 20, No. 24, pp. 5035-5040 (May 13, 2010).

Top view  ———  300 nm

Side view  300 nm

F I G. 7
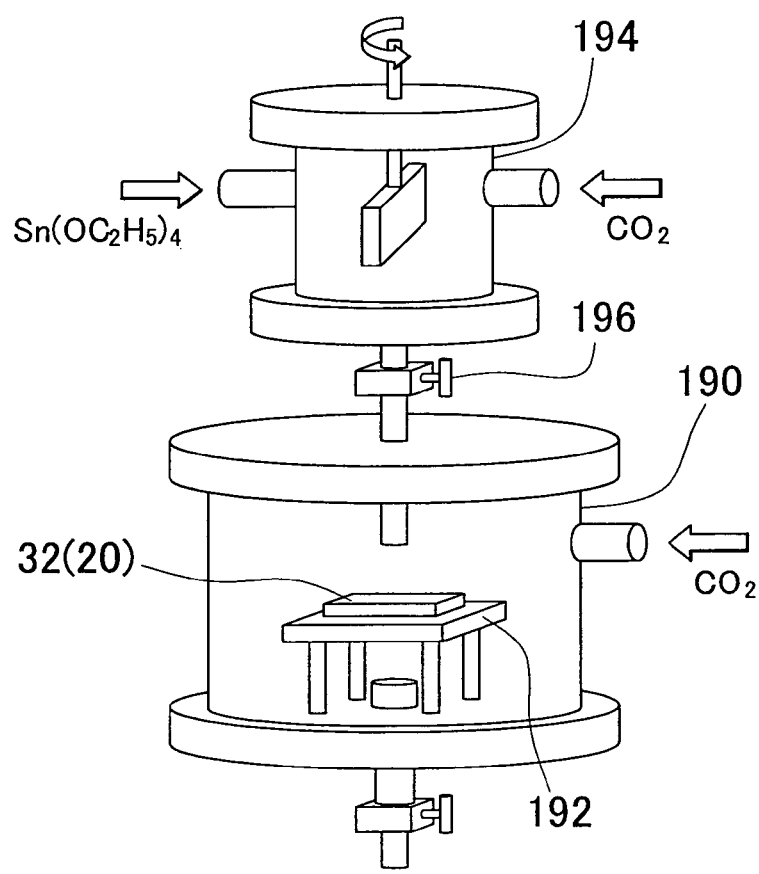

NEGATIVE ELECTRODE FOR LITHIUM SECONDARY BATTERY, METHOD FOR PREPARING THE NEGATIVE ELECTRODE, LITHIUM SECONDARY BATTERY HAVING THE NEGATIVE ELECTRODE, AND VEHICLE HAVING THE LITHIUM SECONDARY BATTERY

CROSS-REFERENCE TO RELATED APPLICATIONS

This application is a national phase application of International Application No. PCT/IB2010/002862, filed Nov. 10, 2010, and claims the priority of Japanese Application No. 2009-258396, filed Nov. 11, 2009, the contents of both of which are incorporated herein by reference.

BACKGROUND OF THE INVENTION

1. Field of the Invention

The present invention relates to a negative electrode for a lithium secondary battery, to a method for preparing the negative electrode, to a lithium secondary battery that has the negative electrode, and to a vehicle that has such a lithium secondary battery. More specifically, the present invention is directed to a negative electrode for a lithium secondary battery that has a configuration in which a negative electrode active substance layer that contains a negative electrode active substance is supported on a negative electrode collector, to a method for preparing the negative electrode, to a lithium secondary battery that has the negative electrode, and to a vehicle that has such a lithium secondary battery.

2. Description of the Related Art

The importance of secondary batteries such as lithium secondary batteries and nickel hydrogen batteries for use as a power source for vehicles or as a power source for personal computers and portable terminals has been increasing in recent years. In particular, lithium secondary batteries which are light weight and provide a high energy density is promising for use as a preferred high output power source for mounting on vehicles. In such lithium secondary batteries, charging and discharging occur through migration of lithium (Li) ions between positive and negative electrodes.

As a typical configuration of an electrode of such a lithium ion battery, there may be mentioned a structure in which an electrode active substance that is capable of reversibly occluding and releasing Li ions is formed on an electrode collector. As a negative electrode collector for use in a negative electrode, there may be mentioned, for example, a sheet-like or foil-like member that is composed mainly of copper or a copper alloy. Examples of the negative electrode active substance for use in a negative electrode include carbonaceous materials such as graphite.

However, because graphite intercalates one Li atom for every six carbon atoms, the charging and discharging capacity thereof is limited to 372 mAh/g at maximum. Various studies have thus been made on negative electrode active substances which are expected to be capable of achieving a charging and discharging capacity that is greater than that of graphite. For example, a study is made to achieve a high battery capacity by using, as a negative electrode active substance, a metal, such as tin or silicon, that forms an alloy with lithium (lithium alloy) (for example, international publication No. 00/42669). Incidentally, the use of carbon nanowall as a negative electrode material (negative electrode active substance) is disclosed in KITADA, Norio, "Application of Carbon Nanowall to Negative Electrode Material for Lithium Ion Secondary Battery", Abstracts of Exchange Meeting of Monodukuri Gijutsu 2008, [online], Nov. 13, 2008, Kanagwa Industrial Technology Center, [searched Jul. 16, 2009], Internet <URL:http://www.kanagawa-iri.go.jp/kitri/kouhou/program/H20/poster.html>, although, this technology is not aimed at an increase of the battery capacity. As technical documents that disclose a carbon nanowall, there may be mentioned, for example, Japanese Patent Application Publication No. 2008-239369 (JP-A-2008-239369) and Japanese Patent Application Publication No. 2008-24570 (JP-A-2008-24570).

When a lithium alloy such as tin or silicon is used as a negative electrode active substance, however, various problems are caused due to a volume change of the negative electrode active substance, because such an alloy expands and shrinks more than graphite does during charging and discharging procedures. That is, in an electrode group in which a negative electrode 5 (which has a structure in which a negative electrode active substance layer 7 that contains a negative electrode active substance 6 in the form of particles is supported on a negative electrode collector 8) and a positive electrode 4 (which has a structure in which a positive electrode active substance layer 3 that contains a positive electrode active substance is supported on a positive electrode collector 2) are wound via separator 9, as shown in FIG. 12, when the volume of the negative electrode active substance 6 is reduced at the time of discharging, the thickness (volume) of the negative electrode active substance layer 7 is reduced by a load applied to the electrode group as shown in FIG. 13. As a result, the structure of the negative electrode active substance layer 7 collapses so that electrical conduction paths between materials are broken. More particularly, as a consequence of collapse of the structure of the negative electrode active substance layer 7, the contact between the negative electrode active substances 6 or between the negative electrode active substance 6 and the collector 8 is broken. This results in a reduction of the current collecting efficiency of the negative electrode 5. Further, when the thickness of the negative electrode active substance layer 7 is reduced by the shrinkage of the negative electrode active substance 6, an available space into which the negative electrode active substance 6 can re-expand at the time of charging is reduced. The negative electrode active substance 6, therefore, fails to smoothly occlude Li ions. This may cause a reduction of the battery capacity.

SUMMARY OF THE INVENTION

The present invention provides a negative electrode for a lithium secondary battery that can prevent a negative electrode active substance layer from structurally collapsing even when a negative electrode active substance which shows a significant volume change at the time of charging and discharging procedures is used for the negative electrode active substance layer; a lithium secondary battery that has such a negative electrode; and a vehicle that has such a lithium secondary battery. The present invention also provides a method for preparing, in a simple manner, a negative electrode for a lithium secondary battery which exhibits the above-mentioned performance.

A first aspect of the present invention relates to a negative electrode for a lithium secondary battery, which includes a negative electrode active substance layer that contains a negative electrode active substance and that is supported on a negative electrode collector. In the negative electrode for a lithium secondary battery, the negative electrode active substance layer comprises carbon nanowalls that are formed on the negative electrode collector, and the negative electrode active substance that is supported on the carbon nanowalls.

According to the above constitution of the present invention, even when a negative electrode active substance that will cause a significant change in its volume as a result of charging and discharging (such as a lithium alloy) is used, the thickness (volume) of the negative electrode active substance layer is maintained constant, since the negative electrode active substance is supported on the carbon nanowalls that are formed on the negative electrode collector and since the carbon nanowalls serve to act as a spacer during the shrinkage (discharging) of the negative electrode active substance. Therefore, structural collapse of the negative electrode active substance layer can be suppressed. With such a negative electrode, notwithstanding that the negative electrode active substance that will cause a significant change in its volume as a result of charging and discharging is used, occlusion of Li ions may smoothly proceed, because a feasible space into which the negative electrode active substance can expand is ensured even in a case where the negative electrode active substance is shrunken. Further, because the negative electrode active substance is supported on the carbon nanowalls that have a high electrical conductivity, the electrical conductivity (electron transfer) between the negative electrode active substances and/or between the negative electrode active substance and the negative electrode collector is ensured through the carbon nanowalls. Therefore, the negative electrode has a high current collecting efficiency. With such a negative electrode, therefore, it is possible to construct a lithium secondary battery that exhibits excellent performance (for example, high battery capacity and excellent cycle characteristics).

In the above-described negative electrode for a lithium secondary battery, the negative electrode active substance may be in the form of particles and filled between the carbon nanowalls. According to this constitution, the negative electrode active substance may be supported with good filling efficiency and the energy density of the negative electrode may increase.

In the above-described negative electrode for a lithium secondary battery, the negative electrode active substance may be in the form of films and cover surfaces of the carbon nanowalls. According to this constitution, the contact area between the negative electrode active substance and the walls is increased so that the adhesion strength between the negative electrode active substance and the walls increases. The negative electrode that is constituted as above is preferable and suitable for the construction of a lithium secondary battery having a low internal resistance.

In the above-described negative electrode for a lithium secondary battery, a lithium alloy may be used as the negative electrode active substance. The term "lithium alloy" as used herein is intended to refer to a substance that is capable of forming an alloy with lithium by charging and is capable of reversibly occluding and releasing lithium. Examples of the substance that is capable of forming an alloy with lithium include elements of metals such as tin (Sn), silicon (Si), zinc (Zn), aluminum (Al), magnesium (Mg), indium (In), cadmium (Cd), lead (Pb), bismuth (Bi) and antimony (Sb), compounds thereof and alloys thereof (inclusive of alloys of lithium with these metallic elements). One or two or more of these substances may be appropriately used upon a proper selection. A lithium alloy, on one hand, generally has a high theoretical capacity and exhibits suitable performance as a negative electrode active substance but, on the other hand, undergoes a significant volume change upon occlusion and release of Li ions. Thus, a negative electrode active substance layer that contains a lithium alloy (typically, that is composed mainly of the lithium alloy) as a negative electrode active substance is liable to cause collapse of the structure thereof upon repeated charging and discharging. In this circumstance, the advantageous effect of the present invention that the durability of the structure of the negative electrode active substance layer is improved by the use of carbon nanowalls as a spacer (structure retaining material) is achieved when a lithium alloy is used as a negative electrode active substance.

In the above-described negative electrode for a lithium secondary battery, the carbon nanowalls may be contained in the negative electrode active substance layer in an amount of 0.1% by volume to 70% by volume, particularly 1% by volume to 50% by volume, based on a whole volume of the negative electrode active substance layer. In the above-described negative electrode for a lithium secondary battery, the carbon nanowalls may have a wall thickness of 1 nm to 100 nm, particularly 3 nm to 50 nm. In the above-described negative electrode for a lithium secondary battery, a distance between surfaces of the carbon nanowalls may be 10 nm to 10,000 nm, particularly 50 nm to 500 nm.

A second aspect of the present invention relates to a negative electrode for a lithium secondary battery. The negative electrode for a lithium secondary battery comprises a negative electrode collector, and a negative electrode active substance layer that is supported on the negative electrode collector and includes carbon nanowalls which are formed on the negative electrode collector, and a negative electrode active substance which is supported on the carbon nanowalls.

A third aspect of the present invention relates to a method for preparing a negative electrode for a lithium secondary battery which comprises a negative electrode active substance layer that contains a negative electrode active substance and that is supported on a negative electrode collector. The preparation method comprises forming carbon nanowalls on the negative electrode collector, and supporting the negative electrode active substance on the carbon nanowalls to form the negative electrode active substance layer. The above method is suited as a method for preparing any one of the negative electrodes for a lithium secondary disclosed herein.

In the above-described method, the negative electrode active substance may be formed into particles and filled between the carbon nanowalls. In the above-described method, the negative electrode active substance in the form of particles may be filled between the carbon nanowalls by using a supercritical fluid method. The use of a supercritical fluid method permits the negative electrode active substance in the form of particles to be uniformly filled in between the whole carbon nanowalls.

In the above-described method, the negative electrode active substance may be formed into films and coated on surfaces of the carbon nanowalls. In this case, in the above-described method, the negative electrode active substance may be formed into films by using a vapor phase growing method. The use of a vapor phase growing method can efficiently form the negative electrode active substance in the form of films on the carbon nanowalls. In the above-described preparation method, a lithium alloy may be used as the negative electrode active substance.

A fourth aspect of the present invention relates to a lithium secondary battery. The lithium secondary battery (typically lithium ion secondary battery) comprises any one of the negative electrodes that are disclosed herein or a negative electrode that is prepared by any one of the methods that are disclosed herein, an electrolyte that is electrically connected to the negative electrode, and a positive electrode that is electrically connected to the electrolyte. Because such a lithium secondary battery is constructed using the above-described negative electrode, excellent battery performance may be obtained. For example, it is possible to provide a lithium secondary battery that has at least one of the following advantages: the volume retention ratio after charging and discharging cycles is high; the internal resistance of the battery is low; and the durability of the battery is good.

Such a lithium secondary battery shows both high energy density and excellent durability and, hence, is suited as a lithium secondary battery that is mounted on a vehicle such as an automobile. Thus, a fifth aspect of the present invention pertains to a vehicle that comprises a lithium secondary battery (inclusive of a combined battery in which a plurality of the lithium secondary batteries are connected together) which is disclosed herein. In particular, the fifth aspect provides a vehicle (such as an automobile) in which the lithium secondary battery is provided as a power source (typically, a power source of a hybrid vehicle or an electric vehicle). In the above-described vehicles, the lithium secondary battery may function as a power source thereof.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 7 is a cross-sectional view that schematically illustrates a $CO_2$ supercritical deposition device according to an embodiment of the present invention;

DETAILED DESCRIPTION OF EMBODIMENTS

Figure 1:
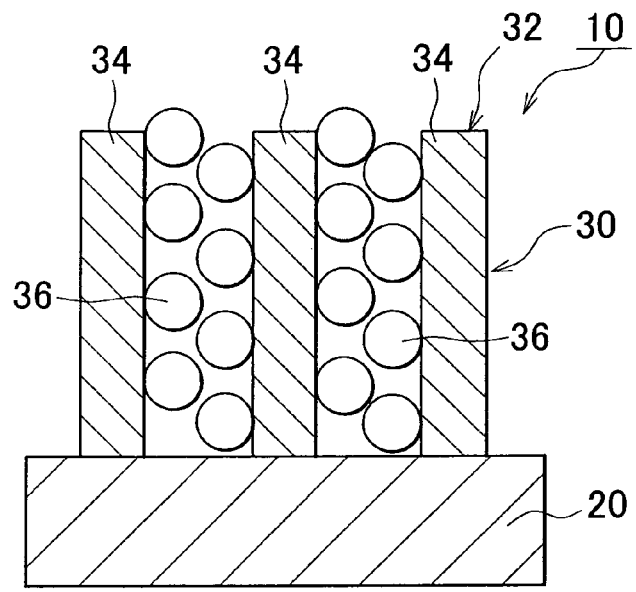
FIG. 1 is a cross-sectional view that schematically illustrates a configuration of a negative electrode according to an embodiment of the present invention.

Embodiments of the present invention will be next described with reference to the drawings. In the drawings, members and parts that have similar function are designated by the same reference numerals. It should be noted that the dimensional relationship (length, width, thickness, etc.) in these drawings do not reflect the actual dimensional relationship. It should also be noted that matters which are other than those specifically referred to in the present specification but which are necessary to practice the present invention (such as constitution and preparation method of an electrode assembly that has positive electrode and negative electrode, constitution and preparation method of a separator and an electrolyte, and general techniques for the construction of a lithium secondary battery) will be understood as matters of design choice which may be made by one of ordinary skill in the art based upon the related art in this field.

With reference to FIG. 1 to FIG. 4, a negative electrode 10 for a lithium secondary battery is described. FIG. 1 is a cross-sectional view that schematically illustrates a configuration of the negative electrode 10 according to an embodiment of the present invention. The negative electrode 10 has a configuration in which a negative electrode active substance layer 30 that contains a negative electrode active substance 36 is supported on a negative electrode collector 20. The negative electrode active substance layer 30 is comprised of carbon nanowalls (CNW) 32 and the negative electrode active substance 36 supported on the carbon nanowalls 32.

The negative electrode collector 20 is formed mainly of a conductive metal. Copper or other metals suitable for negative electrodes of lithium secondary batteries may be suitably used for this purpose. In the present embodiment, a copper foil having a thickness of about 10 μm to 30 μm is used.

Figure 2:
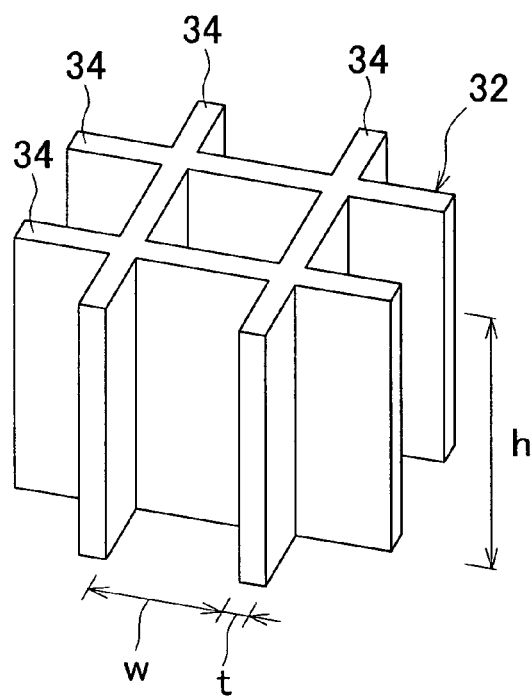
FIG. 2 is a perspective view that schematically illustrates carbon nanowalls according to an embodiment of the present invention.
Figure 3:
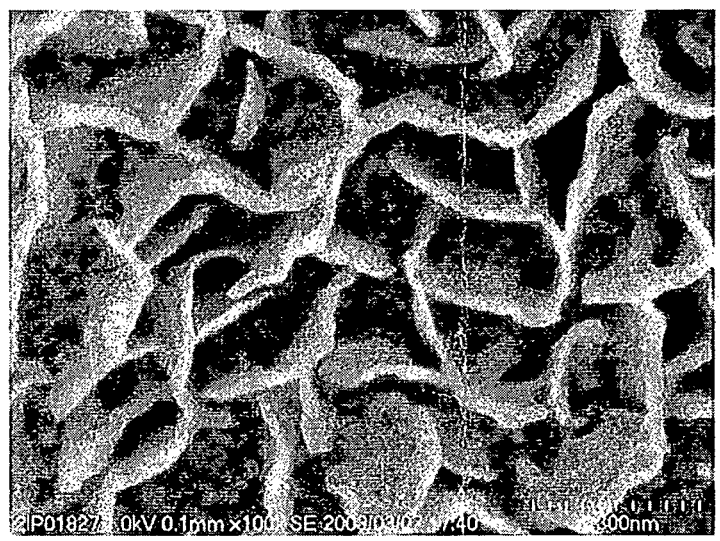
FIG. 3 is a SEM image of carbon nanowalls as observed from above.
Figure 4:
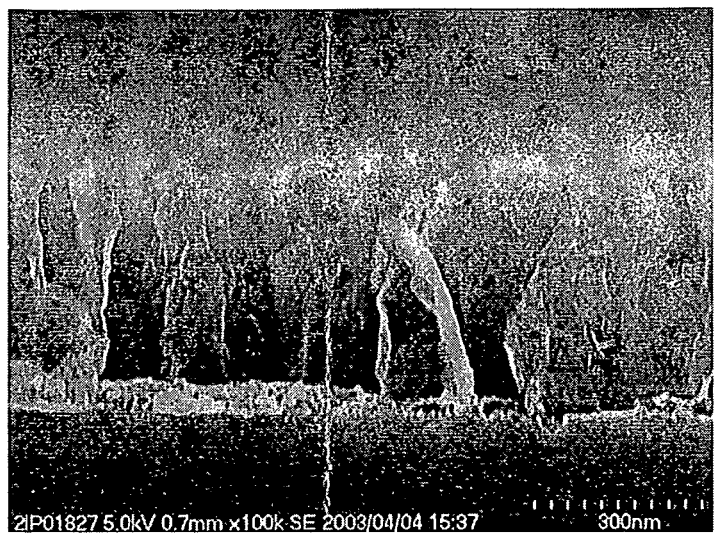
FIG. 4 is a SEM image of a cross-section of carbon nanowalls.

Carbon nanowalls 32 are formed on the negative electrode collector 20. In the present specification, the term "carbon nanowalls" 32 is intended to refer to the ordinary technical term customarily employed in this field and is not specifically limited. Thus, the carbon nanowalls 32 are a class of two-dimensionally arranged carbon nanostructures and generally have a wall-like structure which rises from a surface of a substrate (here, the negative electrode collector 20) in a substantially uniform direction (typically in a substantially vertical direction). Incidentally, fullerene (such as $C_{60}$) may be regarded as having a zero-dimensional carbon nanostructure and carbon nanotube as having a one-dimensional carbon nanostructure. As shown in FIG. 2 to FIG. 4, typical carbon nanowalls have a wall-like structure in which graphene sheets are vertically grown from a collector surface and are interconnected and spread in a grid-like fashion. FIG. 2 is a perspective view that schematically illustrates a structure of carbon nanowalls, FIG. 3 is a SEM image of carbon nanowalls as observed from above, and FIG. 4 is a SEM image of a cross-section of carbon nanowalls.

The negative electrode active substance 36 is supported on the carbon nanowalls 32. In the present embodiment, the negative electrode active substance 36 is in the form of particles and filled among walls 34. The particle size of the negative electrode active substance is not specifically limited as long as it is less than the gap (w) between two walls 34. For example, the particle size of the negative electrode active substance is about 0.001 μm to about 10 μm, generally preferably about 0.005 μm to about 1 μm.

As the negative electrode active substance, one or two or more of substances that have been conventionally used in lithium secondary batteries may be used without specific restriction. The term "negative electrode active substance" may be interchangeably used with the term "negative electrode active material." As a preferred substance to which the herein disclosed technology can be applied, there may be mentioned a negative electrode substance which contains a lithium alloy as its main ingredient. The term "lithium alloy" as used herein is intended to refer to a substance that is capable of forming an alloy with lithium by charging and is capable of reversibly occluding and releasing lithium. Examples of the substance that is capable of forming an alloy with lithium include elements of metals such as tin (Sn), silicon (Si), zinc (Zn), aluminum (Al), magnesium (Mg), indium (In), cadmium (Cd), lead (Pb), bismuth (Bi) and antimony (Sb), compounds thereof (such as oxides, e.g. tin oxides such as $SnO_2$) and alloys thereof (inclusive of alloys of lithium with these elemental metals). One or two or more of these substances may be appropriately used upon a proper selection.

Figure 13:
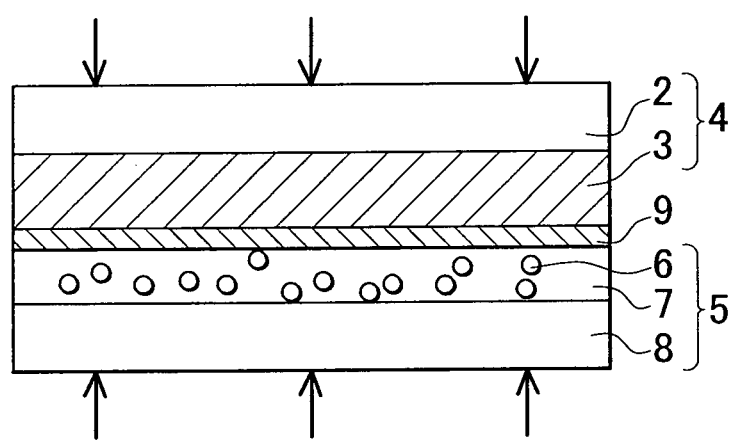
FIG. 13 is a cross-sectional view that schematically illustrates a configuration of a related art battery group.

The above-described lithium alloy, on one hand, generally has a high theoretical capacity and exhibits suitable performance as a negative electrode active substance but, on the other hand, undergoes a significant volume change upon charging and discharging. Therefore, a variety of problems are caused as a consequence of volume change of the negative electrode substance. For example, as shown in FIG. 13, when the volume of the negative electrode active substance 6 is reduced at the time of discharging, the thickness (volume) of the negative electrode active substance layer 7 is reduced by a load applied to the electrode group. As a result, the structure of the negative electrode active substance layer 7 collapses so that an electrical conduction paths between materials (such as between the negative electrode active substance 6 and the collector 8) are broken. Further, when the thickness of the negative electrode active substance layer 7 is reduced by the shrinkage of the negative electrode active substance 6, an available space into which the negative electrode active substance 6 can re-expand is educed. The negative electrode active substance 6, therefore, fails to smoothly occlude Li ions. This may cause a reduction of the battery capacity.

Figure 5:
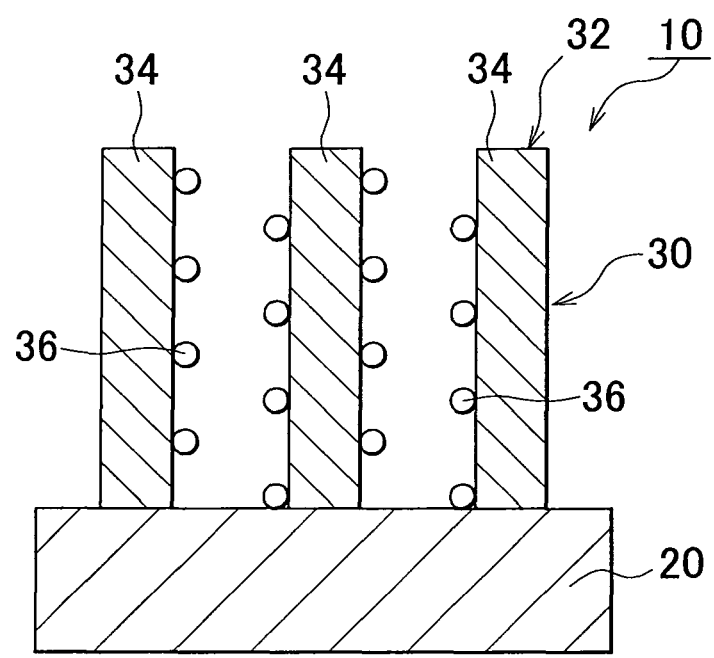
FIG. 5 is a cross-sectional view that schematically illustrates a configuration of a negative electrode according to an embodiment of the present invention.

In the present embodiment, on the other hand, the negative electrode active substance 36 is supported on rigid carbon nanowalls 32 formed of stacked graphene sheets as shown in FIG. 1. By supporting the negative electrode active substance 36 on the carbon nanowalls 32, the structure of the negative electrode active substance layer 30 has improved its durability. For example, even when the negative electrode active substance (such as lithium alloy) 36, which undergoes a significant reduction of the volume thereof upon discharging as shown in FIG. 5, is used, the carbon nanowalls 32 serve to act as a spacer (structure retaining material) during the shrinkage (discharging) of the negative electrode active substance 36 so that the thickness (volume) of the negative electrode active substance layer 30 is maintained constant and structural collapse of the negative electrode active substance layer 30 can be suppressed. With the above-described negative electrode 10, notwithstanding that the negative electrode active substance 36 that will cause a significant change in its volume as a result of charging and discharging is used, occlusion of Li ions may smoothly proceed, because a feasible space into which the negative electrode active substance 36 can expand is ensured even in a case where the negative electrode active substance 36 is shrunken. Further, because the negative electrode active substance 36 is supported on the carbon nanowalls 32 that have a high electrical conductivity, the electrical conductivity (electron transfer) between the negative electrode active substances 36 and/or between the negative electrode active substance 36 and the negative electrode collector 20 is ensured through the carbon nanowalls 32. Therefore, the negative electrode 10 has a high current collecting efficiency. With such a negative electrode 10, therefore, it is possible to construct a lithium secondary battery that exhibits excellent performance (for example, high battery capacity and excellent cycle characteristics). It is to be noted that the above-described effect that the durability of the structure of the negative electrode substance layer 30 is improved by utilization of the carbon nanowalls 32 as a spacer (structure retaining material) may be also achieved when a negative electrode substance that will cause a relatively small change (for example smaller change as compared with a lithium alloy) in its volume upon charging and discharging is used. Therefore, the technology disclosed herein may be suitably applied to negative electrodes for lithium secondary batteries that use various negative electrode active substances. Among others, the technology disclosed herein is of a great significance when applied to a negative electrode that uses a negative electrode substance, such as a lithium alloy, which will cause a great change in its volume upon charging and discharging.

Although not specifically limited thereto, examples of the dimension of the carbon nanowalls 32 preferably used in the present embodiment are as given below. Referring to FIG. 2, the width (t; namely thickness of the wall) of the wall 34 is preferably about 1 nm to about 100 nm, generally preferably about 3 nm to about 50 nm. Too small a thickness below the above range may occasionally cause disadvantages such as a difficulty in production and a reduction of the strength. On the other hand, too large a thickness above the above range may occasionally bring about a reduction of the energy density because the volume proportion of the nanowalls in the electrode is large. The gap between two walls 34 (w; namely distance between surfaces of opposing walls) is preferably about 10 nm to 10,000 nm, generally preferably about 50 nm to 500 nm. Too narrow a gap below the above range may occasionally cause a reduction of the energy density because the volume proportion of the nanowalls in the electrode is large. When the gap is excessively greater than the above range, there may cause disadvantages such as a difficulty in production and a reduction of the strength. The height (h) of the carbon nanowalls is not specifically limited but is below about 100 μm, preferably about 0.5 μm to about 100 μm, generally preferably about 1 μm to about 50 μm. When the height is excessively greater than the above range, productivity may occasionally deteriorate because a long time is required for the growth of the walls.

The proportion of the carbon nanowalls contained in the negative electrode substance layer is not specifically limited. When the proportion of the carbon nanowalls is excessively high, however, the volume proportion of the carbon nanowalls in the electrode is so large that the energy density may be occasionally reduced. Too small a proportion of the carbon nanowalls may cause disadvantages such as a reduction of the strength. Therefore, the proportion of the carbon nanowalls is preferably 0.1% by volume to 70% by volume, generally preferably 1% by volume to 50% by volume, based on the whole volume of the negative electrode active substance layer 30.

The negative electrode active substance layer 30 may contain, in addition to the negative electrode active substance and carbon nanowalls, one or two or more materials which may be used as constituting components of negative electrode active substance layers of ordinary lithium secondary batteries as necessary. Examples of such a material include electrically conductive materials. As the electrically conductive material, carbonaceous materials such as carbon powder and carbon fibers may be used. Alternatively, electrically conductive metal powder such as nickel powder may be used. The herein disclosed technology may be preferably embodied, for example, in a form in which the negative electrode active substance layer 30 is substantially comprised of a negative electrode substance and carbon nanowalls.

Taking the negative electrode 10 that has the above-described structure as an example, a method for the preparation of a negative electrode for a lithium secondary battery according to the present embodiment will be next described.

In the herein disclosed negative electrode preparation method, a negative electrode collector 20 is first provided (produced, purchased, etc.). Carbon nanowalls 32 are then formed on the negative electrode collector 20. A method for forming the carbon nanowalls 32 on the negative electrode collector 20 is not specifically limited but may be done by, for example, vapor phase growing carbon nanowalls on a surface of the collector. In the herein disclosed technology, a plasma CVD method in which a carbon source gas (a gas, such as $C_2F_6$, $CF_4$ and $CH_4$, that can provide carbon which is a raw material for carbon nanowalls and that contains carbon (C) as its constituting element) and H radicals are introduced into a chamber, may be preferably adopted for the vapor phase growth of carbon nanowalls.

It is preferred that carbon nanowalls be formed on the surface of the collector 20 which includes at least a region in which the negative electrode active substance layer 30 is to be formed. For example, when the negative electrode active substance layer 30 is to be formed on one side (a portion or an entire area of the one side) of the collector 20, it is preferable to adopt an aspect in which carbon nanowalls 32 are formed on a portion or an entire area of the one side. When the negative electrode active substance layer 30 is to be formed on both surfaces of the collector 20, an aspect in which carbon nanowalls 32 are formed on a portion or an entire area of each of the both surfaces is preferred.

After the carbon nanowalls 32 have been formed on the collector, a negative electrode active substance 36 is supported on the carbon nanowalls to form the negative electrode active substance layer 30. In the present embodiment, the negative electrode active substance 36 is formed into particles and filled in the space between the walls 34. It is to be noted that a part of the negative electrode active substance 36 may protrude from the upper ends of the carbon nanowalls 32 (see FIG. 1) or a part of the negative electrode active substance 36 may be supported on top ends of the carbon nanowalls 32.

A method for filling the negative electrode active substance between the walls is not specifically limited but is preferably done by, for example, a supercritical fluid method. In the supercritical fluid method, a negative electrode active substance or its raw material (a precursor compound such as a metal salt or complex) is dissolved in a fluid in a supercritical state (e.g., supercritical $CO_2$). This is filled in between walls of the carbon nanowalls and is then subjected to a heat treatment to deposit crystals of the negative electrode active substance on surfaces of the walls. Since the supercritical fluid, which has a low surface tension, can swiftly penetrate between the walls, the negative electrode active substance can be uniformly filled in between the whole carbon nanowalls.

A negative electrode 10 that has the negative electrode active substance layer 30 which includes the carbon nanowalls 32 on which the negative electrode active substance 36 is supported is thus prepared by forming the carbon nanowalls 32 on the collector 20 and filling the negative electrode active substance 36 in between the walls 34 of the carbon nanowalls 32. In this manner, the negative electrode 10 which has the negative electrode active substance 36 that is supported on the carbon nanowalls 32 and which has the negative electrode active substance layer 30 that is prevented from causing structural collapse can be prepared.

Figure 6:
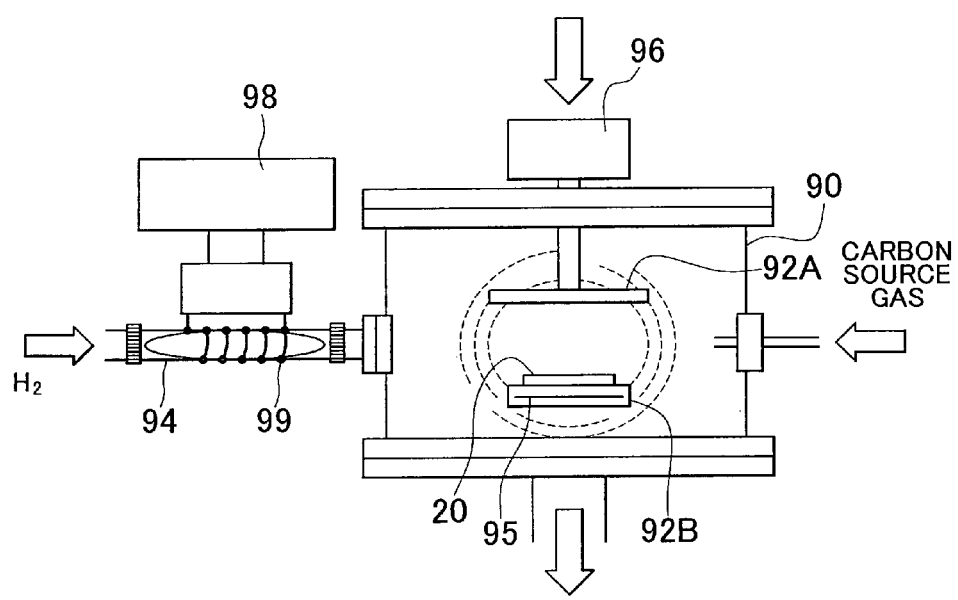
FIG. 6 is a cross-sectional view that schematically illustrates a device (plasma CVD device) for the preparation of carbon nanowalls according to an embodiment of the present invention.

Specific examples of the present invention will be next described in detail below with reference to FIG. 6 and FIG. 7.

A copper foil was used as the negative electrode collector 20. Carbon nanowalls were formed on a surface of the copper foil. The formation of carbon nanowalls was done using a plasma CVD device shown in FIG. 6. More specifically, the copper foil 20 was disposed within a chamber 90. A carbon source gas (here, $C_2F_6$) was introduced between flat plate electrodes (first electrode 92A and second electrode 92B) disposed in parallel with the copper foil 20. Further, a $H_2$ gas was introduced into the chamber through a feed pipe 94. The distance between the copper foil 20 and the flat plate electrode 92A was 5 cm. The flow rate of the carbon source gas ($C_2F_6$) was 15 sccm, while the flow rate of the $H_2$ gas was 30 sccm. The total pressure within the chamber 90 was adjusted to 100 mTorr.

And, while feeding the carbon source gas ($C_2F_6$) into the chamber, an RF power of 13.56 MHz and 100 W was applied from a plasma generation source 96 to the first electrode 92A so that the carbon source gas ($C_2F_6$) was activated by RF waves to generate plasma. Thus, an atmosphere of capacitively coupled plasma was formed between the copper foil 20 and each of the flat plate electrodes 92A and 92B. Further, while feeding the $H_2$ gas from the feed pipe 94, an RF power of 13.56 MHz and 400 W was applied from a radiofrequency output device 98 to coils 99 so that the $H_2$ gas within the feed pipe 94 was activated by RF waves to generate inductively coupled plasma (H radicals). This was introduced into the chamber 90. Thus, while heating the copper foil 20 at 500° C. with a heater 95, carbon nanowalls were grown on the copper foil 20 for 8 hours to form carbon nanowalls having a predetermined height (about 5 μm to 20 μm) on the copper foil 20.

On the carbon nanowalls 32 that had been formed on the copper foil, tin oxide ($SnO_2$) as a negative electrode active substance 36 was supported to form a negative electrode active substance layer 30 thereon. The supporting of tin oxide (negative electrode active substance) was carried out using a supporting device that used $CO_2$ supercritical fluid as shown in FIG. 7. Specifically, the copper foil 20 on which the carbon nanowalls had been formed was set in position on a ceramic heater 192 provided in a chamber 190. The chamber 190 was filled with $CO_2$ in a supercritical state at 100° C. and 12 MPa. At this time, supercritical $CO_2$ was also filled in a stirring vessel 194 which was in communication with the chamber 190 through a valve 196 in an open state. The valve 196 was then closed. Then, 5 mL of $Sn(OC_2H_5)_4$ as a source of tin was fed to the stirring vessel 194 and dissolved in supercritical $CO_2$ in the stirring vessel 194 while rotating the stirring blades. The valve 196 was then opened and the supercritical $CO_2$ in which $Sn(OC_2H_5)_4$ was dissolved was introduced into the chamber 190. Thus, the supercritical $CO_2$ in which $Sn(OC_2H_5)_4$ was dissolved penetrated between walls of the carbon nanowalls 32. The carbon nanowalls 32 was heated with the ceramic heater 192 and maintained at 170° C. for 30 minutes to precipitate tin oxide on surfaces of the walls. In this manner, the negative electrode active substance layer 30, that contained the carbon nanowalls on which the negative electrode active substance was supported, was obtained.

Figure 8:
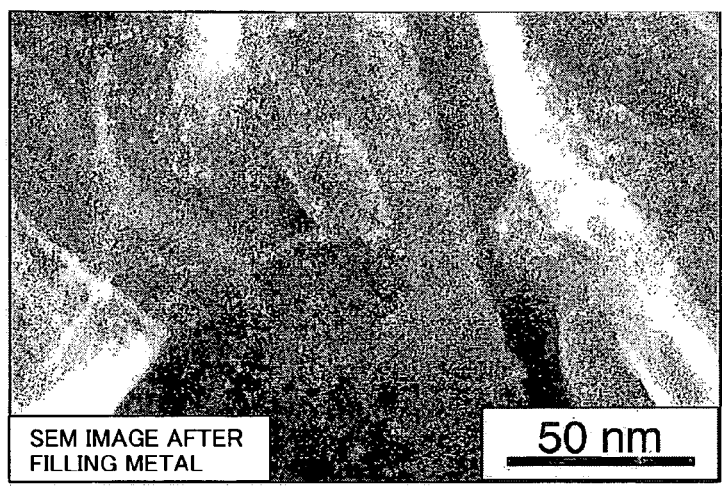
FIG. 8 is a SEM image of a cross-section of carbon nanowalls according to an embodiment of the present invention after deposition of an active substance.

A SEM image of the thus obtained carbon nanowalls after the negative electrode active substance has been supported thereon is shown in FIG. 8. FIG. 8 is a SEM image of a cross-section of the carbon nanowalls after deposition of the negative electrode active substance. The white spots in FIG. 8 are particles of tine oxide (negative electrode active substance) supported between the walls. As understood from FIG. 8, it was confirmed that a negative electrode active substance in the form of particles can be supported on carbon nanowalls by the method according to the present embodiment.

One embodiment of a lithium secondary battery, that is constructed with the use of the negative electrode 10 which was prepared by the method according to the present invention, will be next described with reference to the schematic drawing that is shown FIG. 9.

Figure 9:
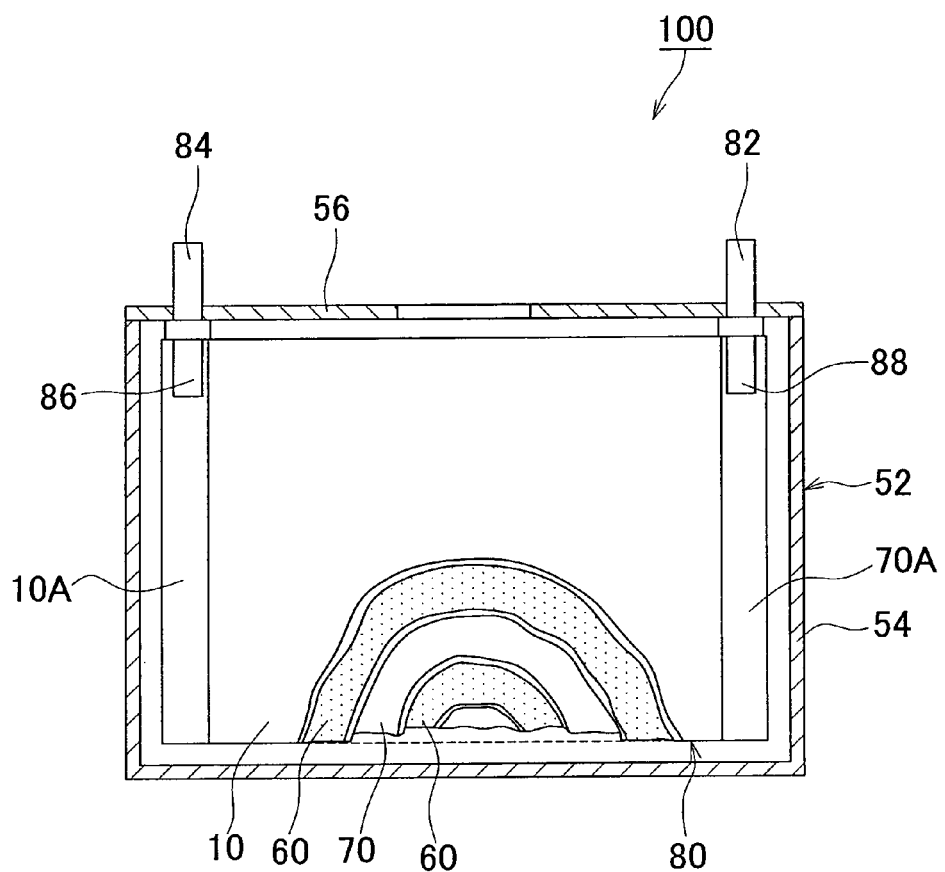
FIG. 9 is a view that schematically illustrates a configuration of a lithium secondary battery according to an embodiment of the present invention.

As shown in FIG. 9, a lithium secondary battery 100 according to the present embodiment has a casing 52 that is made of a metal (a casing that is made of a resin or a laminate film may be suitably used). The casing 52 (outer housing) has an open topped, flat, rectangular parallelepiped case body 54 and a lid 56 that covers the opening thereof. In a top (namely, lid 56) of the casing 52, there are provided a positive terminal 82 that is electrically connected to a positive electrode 70 of an electrode body 80, and a negative terminal 84 that is electrically connected to a negative electrode 10 of the electrode body. The electrode body 80 which is in the form of a flattened roll is accommodated within the casing 52. The electrode body 80 is manufactured by, for example, laminating an elongated sheet-like positive electrode (positive electrode sheet) 70, an elongated sheet-like negative electrode (negative electrode sheet) 10 and two elongated sheet-like separators (separator sheets) 60 together, winding the laminate, and then laterally compressing and flattening the obtained roll.

Materials that are used to form the negative electrode sheet 10 are as described previously. The positive electrode sheet 70 has a configuration in which a positive electrode active substance layer that contains a positive electrode substance as a main ingredient is provided on each of both surfaces of an elongated sheet-like positive electrode collector. As the positive electrode collector, an aluminum foil (in the present embodiment) or a metal foil suited for use as a positive electrode may be suitably used.

As the positive electrode active substance, one or two or more substances conventionally used in lithium secondary batteries may be used without restriction. As examples of suitable positive electrode active substances, there may be mentioned lithium manganese-based composite oxides (namely, oxides that contain lithium and manganese as their constituting metal elements, for example $LiMn_2O_4$), lithium cobalt-based composite oxides (for example $LiCoO_2$) and lithium nickel-based composite oxides (for example $LiNiO_2$). At one side end of each of the electrode sheets 10 and 70 in the width direction, there is formed an electrode active substance layer-free portion in which no electrode active substance layer is formed on both surfaces thereof. As an example of the separator sheet 60 inserted between the positive and negative electrode sheets 70 and 10, there may be mentioned a sheet formed of a porous polyolefin-based resin.

In the above-described lamination, the positive electrode sheet 70 and the negative electrode sheet 10 are superposed such that they are widthwise offset from each other so that the positive electrode active substance layer-free portion of the positive electrode sheet 70 and the negative electrode active substance layer-free portion of the negative electrode sheet 10 widthwise protrude from the both widthwise sides of the separator sheet 60. As a consequence, in the lateral direction relative to the winding direction of the rolled electrode body 80, the electrode active substance layer-free portions of the positive electrode sheet 70 and negative electrode sheet 10 each protrude outward from the rolled core region (namely, a region at which the positive electrode active substance layer-formed portion of the positive electrode sheet 70, the negative electrode active substance layer-formed portion of the negative electrode sheet 10 and two separator sheets 60 are tightly wound together). To such a positive electrode-side protruded portion (namely, the positive electrode active substance layer-free portion) 70A and a negative electrode-side protruded portion (namely, the negative electrode active substance layer-free portion) 10A, a positive electrode lead terminal 88 and a negative electrode lead terminal 86 are attached, respectively, to which in turn are electrically connected the above-described positive electrode terminal 82 and negative electrode terminal 84.

Next, the rolled electrode body 80 is inserted from the upper top opening of the case body 54 and accommodated in the case body 54, and an electrolyte liquid that contains a suitable electrolyte is placed (poured) in the case body 54. The electrolyte is, for example, a lithium salt such as $LiPF_6$. For example, a non-aqueous electrolyte liquid that is obtained by dissolving a suitable amount (for example, to provide 1 M concentration) of a lithium salt such as $LiPF_6$ in a mixed solvent of diethyl carbonate and ethylene carbonate (with, for example, a mass ratio of 1:1) may be used. It is to be noted that an electrolyte in the form of a gel or a solid electrolyte may be substituted for the electrolyte liquid.

Thereafter, the above-described opening is closed with the lid 56 and sealed by welding or the like, whereby the assembly of the lithium secondary battery 100 according to the present embodiment is completed. A process for sealing the casing 52 and a process for placing (liquid pouring), the electrolyte may be carried out by methods that are customarily employed for the preparation of lithium secondary batteries and do not characterize the present invention. In the manner as described above, the fabrication of the lithium secondary battery 100 according to the present embodiment is completed.

When the thus obtained lithium secondary battery is charged, Li ions are released from the positive electrode 70 and are occluded in the negative electrode active substance of the negative electrode 10 through the electrolyte liquid. Upon discharging, Li ions are released from the negative electrode 10 and are occluded in the positive electrode active substance of the positive electrode 70 through the electrolyte liquid. Thus, upon charging and discharging, the negative electrode active substance 36 repeats expansion and shrinkage (see FIG. 1 and FIG. 5). In the present embodiment, however, since the structural durability of the negative electrode active substance layer 30 is improved by the use of carbon nanowalls 32 as a spacer (structure retaining material), structural collapse of the negative electrode active substance layer 30 does not occur. Accordingly, the lithium secondary battery 100 according to the present embodiment, which is constructed by using the above negative electrode, can exhibit excellent battery performance. For example, it is possible to provide a lithium secondary battery that has at least one of the following advantages: the volume retention ratio after charging and discharging cycles is high; the internal resistance of the battery is low; and the durability of the battery is good.

Preferred embodiments of the present invention have been described in the foregoing. These descriptions are, however, not restrictive. It goes without saying that various modifications may be made.

Figure 10:
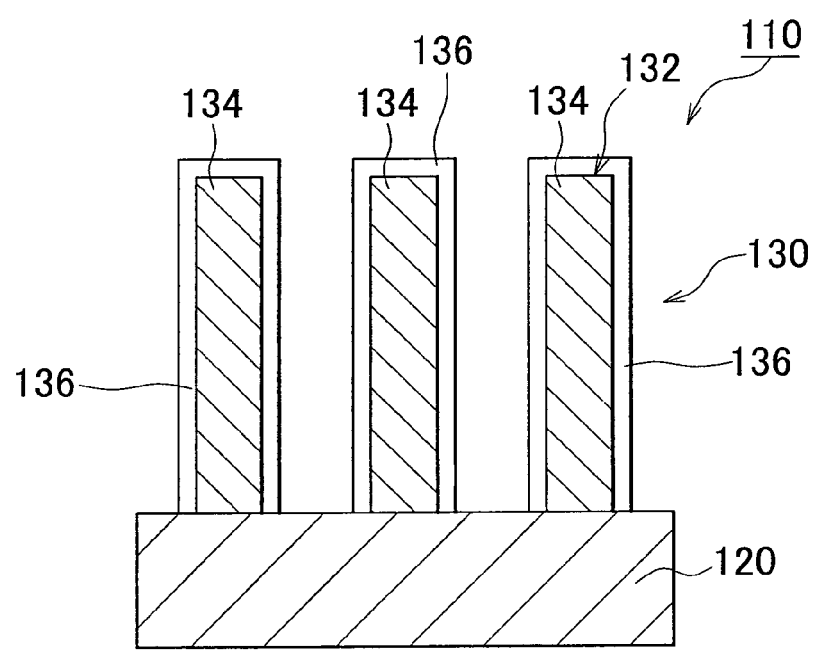
FIG. 10 is a cross-sectional view that schematically illustrates a configuration of a negative electrode according to an embodiment of the present invention.

For example, in the above-described embodiment, the negative electrode active substance 36 in the form of particles is filled in the space between the walls 34. However, the negative electrode active substance is not limited to being in the form of particles only. Rather, as shown in FIG. 10, a negative electrode active substance 136 may be formed into, for example, a film-like form so that surfaces of walls 134 may be covered with the film-like negative electrode active substance 136. A method for forming the negative electrode active substance 136 on surfaces of the walls is not specifically limited but may be preferably performed by conventional vapor phase film forming method such as a physical vapor deposition method (PVD method) and a chemical vapor deposition method (CVD method). As a method for forming a negative electrode active substance on surfaces of the walls in the herein disclosed technology, there may be used, for example, a chemical vapor deposition method using an organometallic compound (MOCVD method). The use of a MOCVD method may form a film-like negative electrode active substance on surfaces of the walls in an efficient manner. In this case, because the carbon nanowalls and the negative electrode active substance may be continuously formed in a series of procedures for a vapor phase growing method, the manufacturing process can be simplified as compared with the conventional method (such as a method in which a composition in the form of a paste that contains particles of a negative electrode active substance and a binder, is first prepared, then applied onto a negative electrode collector and then dried).

Figure 11:
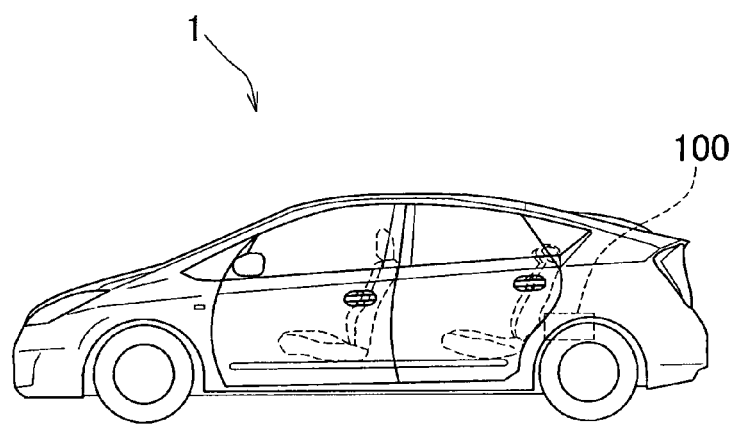
FIG. 11 is a side view that schematically illustrates a vehicle on which a battery according to an embodiment of the present invention is mounted.
Figure 12:
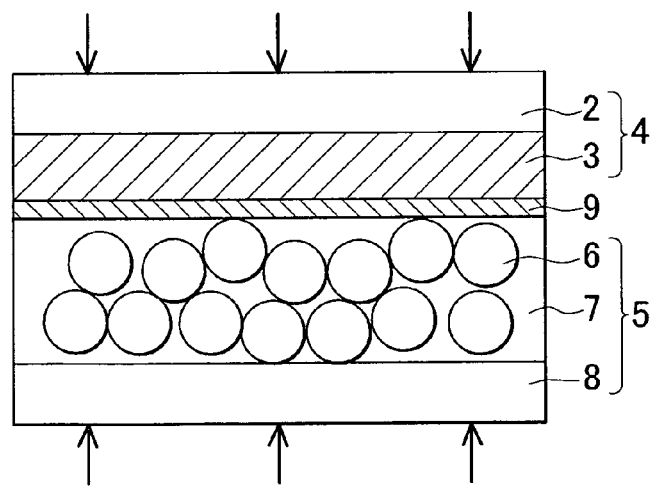
FIG. 12 is a cross-sectional view that schematically illustrates a configuration of a related art battery group.

The lithium secondary battery 100 according to the present embodiment, which has excellent battery performance as described above, may be particularly suitably used as power source for a motor (electric motor) that is mounted on a vehicle such as an automobile. Thus, as schematically shown in FIG. 11, the present invention provides a vehicle 1 (typically an automobile, in particular an automobile that is provided with an electric motor, such as a hybrid automobile, an electric automobile and a fuel cell automobile) that comprises such a lithium secondary battery 100 (inclusive of a combined battery in which a plurality of the lithium secondary batteries are connected in series) as power source.

The invention claimed is:

1. A negative electrode, comprising a negative electrode active substance layer that contains a negative electrode active substance that is capable of releasing lithium ions during battery discharging and that is supported on a negative electrode collector, wherein
the negative electrode active substance layer comprises carbon nanowalls that are formed on the negative electrode collector, and the negative electrode active substance that is supported on the carbon nanowalls.

2. The negative electrode according to claim 1, wherein the negative electrode active substance is in the form of particles and is filled between the carbon nanowalls.

3. The negative electrode according to claim 1, wherein the negative electrode active substance is in the form of films and covers surfaces of the carbon nanowalls.

4. The negative electrode according to claim 1, wherein a lithium alloy is used as the negative electrode active substance.

5. The negative electrode according to claim 1, wherein the carbon nanowalls are contained in the negative electrode active substance layer in an amount of 0.1% by volume to 70% by volume based on a whole volume of the negative electrode active substance layer.

6. The negative electrode according to claim 5, wherein the carbon nanowalls are contained in the negative electrode active substance layer in an amount of 1% by volume to 50% by volume based on a whole volume of the negative electrode active substance layer.

7. The negative electrode according to claim 1, wherein the carbon nanowalls have a wall thickness of 1 nm to 100 nm.

8. The negative electrode according to claim 7, wherein the carbon nanowalls have a wall thickness of 3 nm to 50 nm.

9. The negative electrode according to claim 1, wherein a distance between surfaces of the carbon nanowalls is 10 nm to 10,000 nm.

10. The negative electrode according to claim 9, wherein a distance between surfaces of the carbon nanowalls is 50 nm to 500 nm.

11. A method for preparing a negative electrode which comprises a negative electrode active substance layer that contains a negative electrode active substance that is capable of releasing lithium ions during battery discharging and that is supported on a negative electrode collector, comprising:
forming carbon nanowalls on the negative electrode collector, and
supporting the negative electrode active substance on the carbon nanowalls to form the negative electrode active substance layer.

12. The method according to claim 11, wherein the negative electrode active substance is formed into particles and filled between the carbon nanowalls.

13. The method according to claim 12, wherein the negative electrode active substance in the form of particles is filled by using a supercritical fluid method.

14. The method according to claim 11, wherein the negative electrode active substance is formed into films and coated on surfaces of the carbon nanowalls.

15. The method according to claim 14, wherein the negative electrode active substance is formed into films by using a vapor phase growing method.

16. The method according to claim 11, wherein a lithium alloy is used as the negative electrode active substance.

17. A lithium secondary battery comprising:
the negative electrode as recited in claim 1.

18. A vehicle comprising:
the lithium secondary battery as recited in claim 17.

19. The vehicle according to claim 18, wherein the lithium secondary battery is a power source for driving of the vehicle.

20. A lithium secondary battery comprising:
the negative electrode that is prepared by the method as recited in claim 11.

21. A vehicle comprising:
the lithium secondary battery as recited in claim 20.

* * * * *